Aug. 4, 1936.  J. R. STRALEY  2,049,783

TRANSMISSION TOWER

Filed Dec. 4, 1933  2 Sheets-Sheet 1

INVENTOR:
John R. Straley,
BY
ATTORNEY.

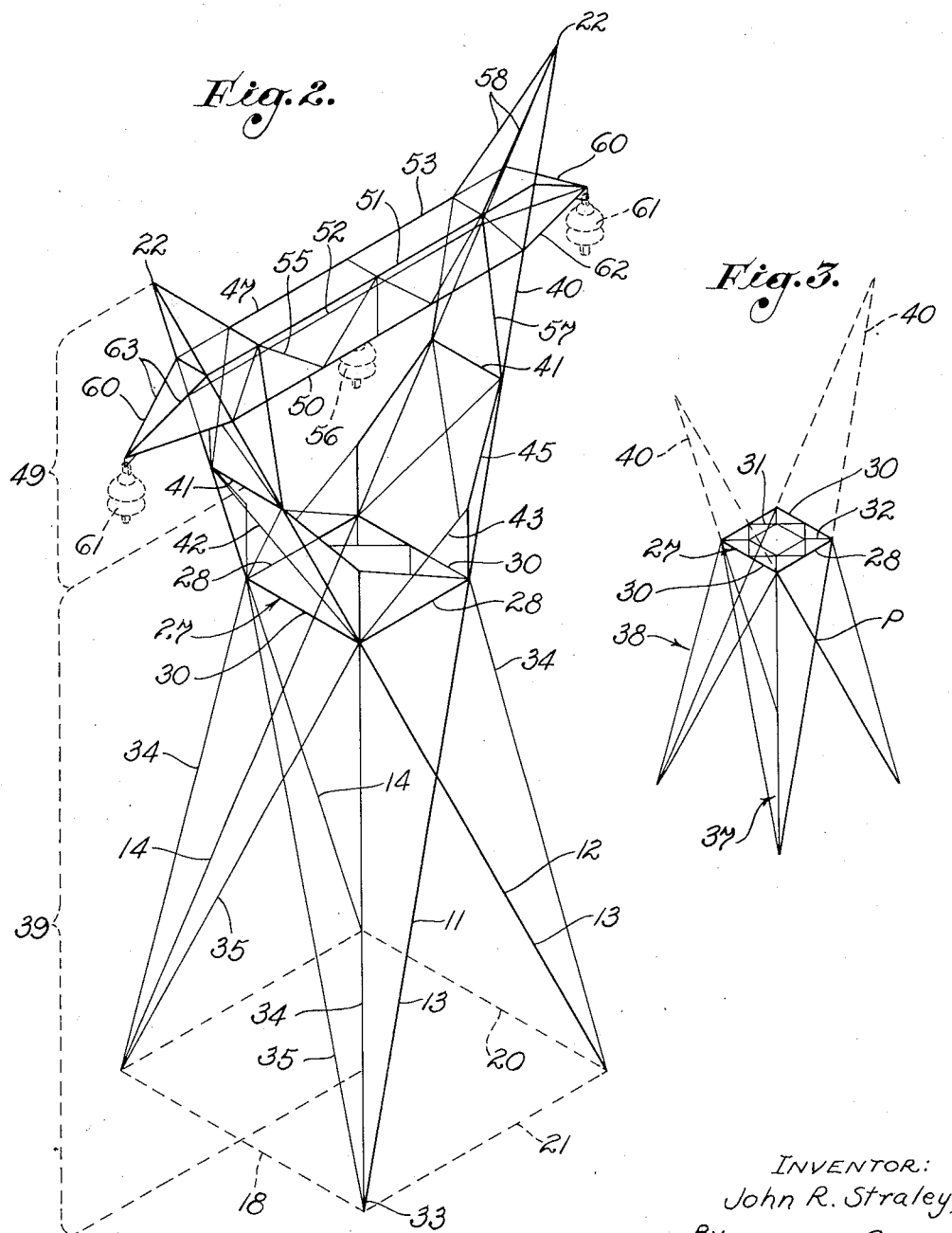

Patented Aug. 4, 1936

2,049,783

UNITED STATES PATENT OFFICE 2,049,783

TRANSMISSION TOWER

John R. Straley, Los Angeles, Calif., assignor to Arthur W. Lewis, La Canada, Calif.

Application December 4, 1933, Serial No. 700,857

12 Claims. (Cl. 189—13)

My invention relates to transmission towers of the character fabricated from steel structural shapes.

It is an object of my invention to provide a transmission tower which departs materially from the accepted form of construction in which towers are built up in much the same manner as derricks of the character employed in oil wells. In my present invention by the use of main structural members in a novel crossing relation, I obtain a number of valuable and novel features relating to simplicity of construction, increased strength, and artistic appearance, all of which are attained without sacrificing any of the requirements for a transmission tower relating to the proper hanging or supporting of insulators.

An object of my invention is to provide a tower which is constructed from and around or upon a pair of A shaped leg members which are disposed in a characteristic crossing relation so that they may be tied together and structurally reinforced at points intermediate their ends so as to leave a central space defined by the upper end portions thereof through which a conductor may pass.

A further object of my invention is to provide a tower in which substantially all of the weight of the superstructure and conductors is carried by the base structure.

Considered from a different angle, my invention has for its object to provide a structure in which main leg elements are employed in pairs, the leg elements of each pair having a definite crossing relation and defining the side faces of an upright wedge figure.

Further objects and advantages of the invention will be made evident throughout the following part of the specification.

Referring to the drawings, which are for illustrative purposes only,

Fig. 2 is a perspective view showing the completed transmission tower.

Fig. 3 is a perspective view showing the sub-base of the tower.

Figure 1:
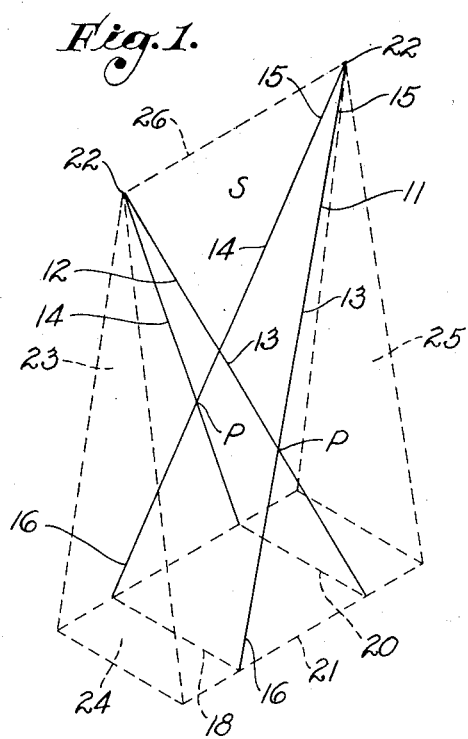
Fig. 1 is a diagrammatic perspective view showing the simple elements around and upon which the invention is constructed.

A characteristic feature of my invention, when considered from one view point, may be looked upon as a pair of A shaped leg members 11 and 12 placed in a definite crossing relation, as shown in Fig. 1, and then structurally reinforced and supplemented, as shown in Fig. 2. The A shaped leg members each consist of a pair of leg elements 13 and 14 which may consist of single lengths of structural steel or may be fabricated from a plurality of structural parts secured together in end-to-end relation. The upper ends 15 of the leg elements 13 and 14 are in somewhat close relation and may be tied together in accordance with standard structural practices. The lower ends 16 of the leg elements 13 and 14 are spread apart so that the two members 13 and 14 assume an A shaped relation. The lower ends of the leg members 11 and 12 are in opposing relation, as shown in Fig. 1, and in such relation are preferably placed so as to rest upon the opposite sides 18 and 20 of a square figure 21 which may be the outline of a foundation member. The A shaped leg member 11 is sloped rightwardly, and the leg member 12 is sloped leftwardly, so that these leg members cross at points P intermediate the ends thereof, the points of crossing being preferably disposed closer to the lower ends than to the upper ends. Accordingly, the slope of the crossing leg members 11 and 12 is such that the upper extremities 22 thereof will be spaced apart a distance greater than the distance between the lines 18 and 20 of the square 21, thereby leaving a material space S between the upper parts of the leg members 11 and 12.

In the positions in which they are shown in Fig. 1, the A shaped leg members 11 and 12 define an upright wedge figure 23 having a base 24 which is of the same width as the square 21 but is substantially twice the length thereof, and having upwardly converging side faces 25 which meet at an upper edge 26.

Another manner of viewing the essential characteristic set forth in the preceding paragraphs is to consider that the pairs of leg elements 13—13 and 14—14 are arranged in crossing relation so as to substantially form a letter X, and that the pairs of crossing elements 13—13 and 14—14 are disposed in facing relation and that they converge in upward direction so as to define the side faces of an upright wedge figure 23. As shown in Fig. 2, the leg elements 13—13 and 14—14 are structurally tied together and braced by the use of an economical arrangement of structural members. In a horizontal plane disposed a short distance above the point of crossing P, the four members 13—13 and 14—14 are connected together by a horizontal frame member 27 which is preferably rectangular in form and consists of parallel front and rear bars 28 and parallel side bars 30. The shape of the rectangular frame 27 varies with its distance from the point of crossing P. In the preferred form of the invention as shown, the frame 27 is spaced at such distance above the point P that it will be in the form of a square. As shown in Fig. 3, the frame 27 may be suitably braced by use of diagonal members 31 and auxiliary bracing members 32. From the lower end 33 of each leg element 13—13 and 14—14 a pair of auxiliary leg elements 34 and 35 are upwardly extended, each of the auxiliary leg elements 34 extending through vertical planes to the corners of the frame lying above the lower ends thereof. Accordingly, the auxiliary leg elements 34 extend in the planes forming the side faces of the imaginary wedge figure 23 which has been defined by the separate crossing pairs of leg elements 13—13 and 14—14. The auxiliary leg elements 35 do not lie in the sloping planes of the wedge but extend through planes defined by the sides 18 and 20 of the rectangular base figure 21 and the side bars 30 of the frame 27. The auxiliary leg elements 35, which connect with adjacent leg elements 13 and 14, extend in crossing relation in passing upwardly to connect with adjacent corners of the frame 27. In the foregoing manner the lower parts of each of the leg elements 13 and 14, in conjunction with an auxiliary leg element 34 and an auxiliary leg element 35, form a rigidly braced leg structure 37, as shown in Fig. 3, there being four of the leg structures 37 forming what may be termed the sub-base 38 of the tower. It is to be understood that the structural members in the various drawings are shown diagrammatically and that they are suitably joined or bonded together at points of engagement or crossing in accordance with standard structural practices.

Figure 4:
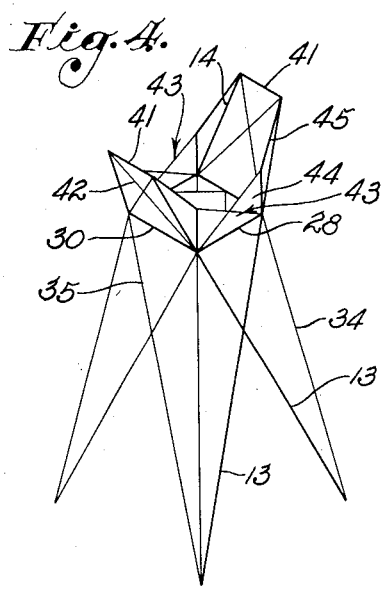
Fig. 4 is a perspective view showing the base unit of the tower.
Figure 5:
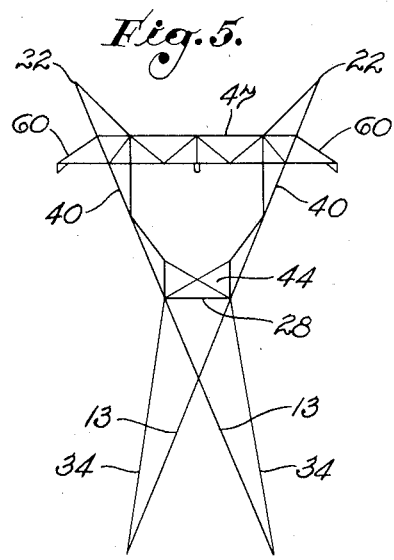
Fig. 5 is a face view of the tower, to reduced scale.

Above the frame 27, which defines the upper extremity of the sub-base 38, the A shaped leg members 11 and 12 form upwardly extending diverging walls or arms, as indicated by dotted lines 40 in Fig. 3 and by full lines in Figs. 2 and 5. These arms 40 are suitably braced by use of lateral tie members 41 connecting adjacent leg elements 13 and 14 in a horizontal plane intermediate the frame 27 and the upper extremities of the leg elements 13 and 14, cross-bracing members 42 between the ties 41 and the side bars 30, and truss formations 43 disposed above each of the front and rear bars 28 and connecting respectively the portions of the leg elements 13 and the leg elements 14 which project upwardly from the frame 27. All of the structure including and below the tie members 41 may be considered as forming a complete structural or base unit 39 of the tower, as shown in Fig. 4, which is entirely self-sustaining and to which any suitable super-structure, such as the super-structure 49, may be secured above the horizontal plane defined by the members 41. In the preferred practice of my invention, however, the leg elements 13 and 14 are continued upwardly beyond the tie members 41 into the parts which may be said to constitute the super-structure 49 of the device, thereby tying the super-structure 49 and the base unit 39 of Fig. 4 together in an effective, economical, and artistic manner.

Each of the reinforcing trusses 43, as shown in Fig. 4, consists of a cross-braced panel 44 constructed on a member 28 of the frame 27, and a diagonal strut or tie 45 connecting the upper corners of the rectangular frame or panel 44 with the leg elements 13 at the ends of the tie members 41. Accordingly, the truss members 43 are of concave form so that they connect the leg elements 13 and 14 together without a material penetration into the central space S. Across the upper part of the space or opening S but in a plane below the upper extremities 22, a lintle 47 is carried, this lintle consisting of two front chord members 50 and 51 lying in the front plane or face 25 of the wedge figure 23 in vertically spaced relation, and rear chord members 52 and 53 which lie in the rear plane or face 26 of the wedge figure 23, the ends of these chord members 50, 51, 52, and 53 being connected to the leg elements 13 and 14 and being braced by strut and tie-rod members 55 so as to form a truss extending over the upper part of the space S and being especially adapted for support of an insulator 56 in the space between the arms 40 in such position that ample clearance will be provided to avoid contact of a supported conductor with parts of the tower to the side of or below the insulator. To reinforce the upper portions of the arms 40 against lateral movement, vertically extending strut or tie members 57, which are diagonal relative to the leg elements 13 and 14, connect the lower chord members 50 and 52 of the truss or lintle 47 with the leg elements 13 and 14 at the ends of the tie members 41, and diagonal strut or tie members 58 connect the upper chord members 51 and 53 of the truss 47 with the upper extremities of the leg elements 13 and 14. Arms or brackets 60 are extended outwardly from the ends of the truss 47 for the support of insulators 61 in suspended position horizontally aligned with the insulator 56 and spaced from the leg members 11 and 12 to avoid contact of a suspended conductor due to a swinging movement of the supporting insulators 61. The arms 60 comprise lower members 62 which extend outwardly in converging relation from the lower chord members 50 and 52 of the truss 47, and diagonal members 63 which extend downwardly in converging relation from the ends of the upper chord members 51 and 53 to join with the extremities of the members 62.

Figure 6:
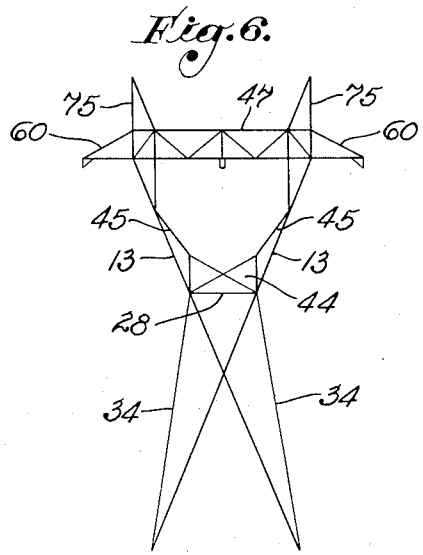
Fig. 6 is a face view of a tower embodying the features of the invention but slightly deviating from the form of the invention first disclosed.

In Figs. 1 to 5, I have shown the leg elements 13 and 14 extending through straight lines from one end to the other thereof. In the practice of the invention there may be no material deviation from the principles of the invention hereinbefore disclosed, without such straight line arrangement of the leg elements 13 and 14. For example, as shown in Fig. 6, the upper extremities 15 of the leg elements 13 and 14 may be bent toward a position of vertical extension without changing the effectiveness or general principles of the structure shown.

It is thus seen that resultant of my novel tower construction substantially all of the weight of the superstructure and conductors is carried by the base structure.

Although I have herein shown and described my invention in simple and practical form, it is recognized that there are certain parts or elements thereof representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; means connecting said leg members together below the upper ends thereof and above said points so as to form a braced structure and an opening between the upper ends of said leg members; a lintle connected between the upper ends of said leg members and across the upper part of said opening; and arm structures extending laterally from the upper portions of said leg members.

2. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; a rectangular frame tying said leg members together in a plane above the point of crossing of said leg members; bracing means connecting said leg members together below the upper ends thereof so as to form a braced structure and an opening between the upper ends of said leg members; a lintle connected between the upper ends of said leg members and across the upper part of said opening; arm structures extending laterally from the upper portions of said leg members; and a pair of complementary leg elements extending upwardly from the lower end of each leg member to a separate corner of said rectangular frame.

3. A tower of the character described, including: two pairs of cooperating leg elements, the leg elements of each pair being in crossing relation so as to form essentially a letter X, said pairs of crossing leg elements being disposed in upright position and in face-to-face relation; a horizontal frame member connecting all of said leg elements together in a plane above the point of crossing of said leg elements; a pair of complementary leg elements extending upwardly from the lower end of each leg element in converging relation and being connected to different points of said horizontal frame member; means connecting said leg elements together below the upper ends thereof so as to define a central space between said upper ends; and means carried by the upper end portions of said leg elements for supporting a carrier in said central space.

4. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; and means connecting said leg members together below the upper ends thereof and above the crossing points so as to form a braced structure.

5. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; and a frame connecting said leg members together below the upper ends thereof and above said crossing points so as to form a braced structure.

6. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; and a rectangular frame tying said leg members together in a plane above the point of crossing of said leg members and below the upper ends thereof.

7. A tower of the character described, including: two pairs of cooperating leg elements, the leg elements of each pair being in crossing relation so as to form essentially a letter X, said pairs of crossing leg elements being disposed in upright position and in face-to-face relation; and a horizontal frame member connecting all of said leg elements together in a plane above the points of crossing of said leg elements and below the upper ends thereof.

8. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; a rectangular frame tying said leg members together in a plane below the upper ends thereof and above said points; and a superstructure connected to said frame.

9. A tower of the character described, including: a base structure comprising a pair of A shaped leg members, each consisting of a pair of leg elements with the upper ends thereof in close relation and the lower ends thereof in spread relation, the lower extremities of said leg members being in opposing relation, and said leg members being sloped so as to cross at points intermediate the upper and lower ends thereof; a rectangular frame tying said leg members together in a plane above the points of crossing; reinforcing trusses connected to said frame; and a superstructure connected to said trusses and to said leg members below the upper ends thereof.

10. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; means tying said leg members together in a plane above the crossing points of said leg members so as to form a braced base structure; and a superstructure connected to said base structure and to said leg members below the upper ends thereof.

11. A tower of the character described, including: a pair of A shaped leg members, each comprising a pair of leg elements with the upper ends thereof in close relation and the lower ends thereof in spread relation, the lower extremities of said leg members being in opposing relation, and said leg members being sloped so as to cross at points intermediate the upper and lower ends thereof; a rectangular frame tying said leg members together in a plane above said points and forming therewith a braced base structure;

and a superstructure connected to said base structure.

12. A tower of the character described, including: a pair of A shaped leg members, each comprising a pair of leg elements, said leg members being sloped so as to cross at points intermediate the upper and lower ends thereof; a frame tying said leg members together in a plane above said points so as to form a braced base structure and an opening between the upper ends of said leg members; a superstructure connected to said base structure; and wire supporting means connected to said superstructure and extending across said opening.

JOHN R. STRALEY.